United States Patent
Chasen

(10) Patent No.: US 6,322,304 B1
(45) Date of Patent: *Nov. 27, 2001

(54) EQUIPMENT SECURING APPARATUS

(76) Inventor: Richard Jeffrey Chasen, 308 Oak Lane, Richmond, VA (US) 23226

(*) Notice: Subject to any disclaimer, the term of this patent is extended or adjusted under 35 U.S.C. 154(b) by 0 days.

This patent is subject to a terminal disclaimer.

(21) Appl. No.: 09/409,996

(22) Filed: Sep. 30, 1999

Related U.S. Application Data

(63) Continuation-in-part of application No. 09/342,593, filed on Jun. 29, 1999, now Pat. No. 6,135,686.

(51) Int. Cl.⁷ ........................................ B60P 7/08
(52) U.S. Cl. .................... 410/120; 410/77; 410/34; 410/35; 410/38
(58) Field of Search ................. 410/34, 32, 35, 410/38, 77, 120; 224/324, 405, 331, 323, 570; 248/503, 316.4; 182/127

(56) References Cited

U.S. PATENT DOCUMENTS

| | | |
|---|---|---|
| 1,705,381 | 3/1929 | Snyder ................................ 410/120 |
| 1,826,893 | 10/1931 | Laren . |
| 2,080,527 | 5/1937 | Bixel . |
| 2,134,823 | 11/1938 | Herrmann et al. . |
| 2,840,288 | 6/1958 | Bradden .............................. 410/120 |
| 3,575,373 | 4/1971 | Reinhardt . |
| 3,672,612 | 6/1972 | Laing, Jr. . |
| 4,008,838 | 2/1977 | Correll . |
| 4,339,064 | 7/1982 | Ziaylek, Jr. . |
| 4,369,009 | 1/1983 | Fulford ................................. 410/35 |
| 4,813,585 | 3/1989 | Nutt . |
| 4,827,742 | 5/1989 | McDonald . |
| 5,009,350 | 4/1991 | Schill et al. . |
| 5,154,258 | 10/1992 | Krukow . |
| 5,186,588 | 2/1993 | Sutton et al. ........................ 410/120 |
| 5,242,094 | 9/1993 | Finley . |
| 5,791,857 | 8/1998 | Ziaylek, Jr. et al. . |
| 6,059,498 | 5/2000 | Ostrowski ............................. 410/34 |
| 6,135,686 | 10/2000 | Chasen ................................. 410/77 |

*Primary Examiner*—Stephen T. Gordon
(74) *Attorney, Agent, or Firm*—Hunton & Williams

(57) ABSTRACT

An equipment securing apparatus for securing equipment to an exterior surface of a vehicle includes first and second support members attached to the vehicle and an elongate shaft extending between the support members and projecting outwardly beyond the vehicle body panel. An engagement member is provided for engaging and retaining equipment on the exterior of the vehicle and a latching assembly is provided to retain the engagement member in a securing relationship with the equipment. Optionally, the equipment securing apparatus may be used with an open vehicle in a matter similar to the manner used with an enclosed vehicle.

1 Claim, 10 Drawing Sheets

EQUIPMENT SECURING APPARATUS

This application is a continuation-in-part of Application Ser. No. 09/342,593, filed Jun. 29, 1999 and now U.S. Pat. No. 6,135,686, which is incorporated by reference herein.

BACKGROUND OF THE INVENTION

The present invention relates broadly to apparatus for securing equipment to vehicles and, more particularly, to an apparatus for securing equipment, particularly ladders to an exterior portion of the vehicle with the apparatus being controllable from an interior portion or an exterior portion of the vehicle.

Ladders, hoses and other elongate equipment that may be required at a job site, rescue site or other event can typically be difficult to transport to and from the event. Construction workers, house painters, firemen, rescue personnel and even homeowners may need to transport ladders or other elongate equipment over highways with their vehicle. Typically, the vehicle may be a truck or van. The equipment is typically sufficiently elongate that the ladders or other equipment cannot be carried within the confines of the vehicle body, or the bed of a pick-up truck.

Typically, ladders and other elongate equipment are lashed to an overhead rack with rope, bungee cords, chains or other strandlike elements. Such impromptu tiedown arrangements can provide an unsafe condition when the vehicle is operated on a roadway. Further, should the vehicle be left unattended, the lack of any locking or securing of the ladders can lead to theft.

Danger also exists when placing ladders on the racks. Typically, when bungee cords or ropes are used, the person securing the ladder to the rack must stand on the bumper, tires, or other body structure to gain access to the ladders that are disposed on the roof or other elevated portion of the vehicle. Similar safety hazards exist when trying to remove ladders stowed on the ladder rack and lashed down with bungee cords or other strands.

The equipment can also become missile hazards in the event of a vehicle crash.

Accordingly, there exists a need for a device which will securely attach ladders or other elongated equipment to overhead racks or other body panel mounted support structures that can quickly and safely secure the equipment while providing an added measure against theft.

SUMMARY OF THE INVENTION

It is accordingly an object of the present invention to provide a simple and effective equipment securing apparatus that will securely retain the equipment against a support structure or against the vehicle itself.

It is another object of the present invention to provide such an equipment securing apparatus that will provide interior control while providing exterior securing support.

To those ends, an equipment securing apparatus is provided for securing equipment to an exterior surface of a vehicle. The vehicle includes body panels defining an interior vehicle portion and an area exterior to the vehicle with at least one of the body panels having a body panel opening formed therein. The equipment securing apparatus is operable from the interior portion of the vehicle to secure equipment exterior to the vehicle. The equipment securing apparatus includes a support member attached to an interior portion of the vehicle adjacent the body panel opening with the first support member having a shaft retaining portion with a passageway formed therein. The equipment securing apparatus also includes an elongate shaft having a proximal end and a distal end with the shaft being slidably mounted through the passageway of the shaft retaining portion and projecting away from the vehicle. The present invention includes an equipment engagement member formed on the distal end of the shaft for securing engagement with equipment on the vehicle and a latching assembly operatively associated with the shaft and selectively operable to retain the engagement member in a securing relationship with the equipment and to release the engagement member from the engagement.

It is preferred that the latching assembly include an arrangement for biasing the shaft against operation of the control arm to assist in retaining the latching assembly in a condition whereby the engagement member is engaged with the equipment. The biasing arrangement preferably includes a spring support member and a spring surrounding the shaft intermediate the support member and the spring support member. It is further preferred that the present invention include a plurality of openings formed in the shaft and a pin arrangement for locking the latching assembly in a latched condition to secure equipment to the vehicle. The pin arrangement includes a stop pin configured to extend through a select one of the openings provided in the shaft to lock the control arm in a fixed disposition with the biasing arrangement in abutment with the stop pin. It is further preferred that the latching assembly include a link member having a pivot end attached to the support member and a free end. A manually operable control arm is preferrably pivotally attached to the free end of the link member and operatively attached to the biasing arrangement to selectively move the biasing arrangement into and out of an engaging relationship with the stop pin.

It is preferred that the engagement member be formed on the shaft and include a first engagement arm projecting laterally away from the distal end of the shaft. It is further preferred that the engagement arm be curved to form a hooklike member. It is additionally preferred that the engagement member include a second engagement arm projecting laterally away from the distal end of the shaft generally oppositely from the first engagement arm.

Preferably, the shaft is rotatably mounted to the shaft retaining portion of the support member for selectively rotating the shaft to move the engagement member to a desired orientation with respect to the equipment to be secured.

It is further preferred that the equipment secured by the present invention be ladders.

According to another embodiment of the present invention, an equipment securing apparatus for securing equipment to a vehicle includes a support member attached to a portion of the vehicle the support member having a shaft retaining portion with a first passageway formed therein. Further, an elongate shaft is provided with the shaft having a proximal end, a distal end and a plurality of openings formed therein, the shaft being slidably mounted to the support member and extending through the first passageway of the shaft retaining portion and projecting away from the vehicle. An equipment engagement member is provided and is formed on the distal end of the shaft for securing engagement with equipment on the vehicle. Also provided is a latching assembly operatively associated with the shaft and including a spring support member and a spring surrounding the shaft intermediate the support member and the spring support member, a stop pin selectively mountable in one of the openings in the shaft, a link member having a pivot end pivotally attached to the support member and a free end, a manual control arm pivotally attached to the free end of the link member and operatively connected to the spring support member to selectively move the spring support member into and out of an engaging relationship with the stop pin to retain the engagement member in a securing relationship with the equipment and to release the engagement member from engagement with the equipment.

When the equipment securing apparatus according to this embodiment is to be used to secure the equipment to the exterior of a vehicle having body panels defining an interior vehicle portion and an area exterior to the vehicle with at least one of the body panels having at least one body panel opening formed therein, the equipment securing apparatus is operable from the interior of the vehicle. The elongate shaft extends through the at least one body panel opening. The vehicle body panel preferably includes a plurality of body panel openings and the shaft extends through a selected one of these body panel openings.

The equipment sewing apparatus according to this embodiment, preferably further includes an arrangement for attaching the support member to the vehicle body panel. The support member preferably includes a generally cylindrical member having the first passageway formed therethrough. The arrangement for attaching the support to the vehicle body includes an elongate support beam attached to the vehicle panel. The support beam has a hole formed therein that is in substantial registry with the at least one body panel opening. A tubular collar is attached to the support beam. This collar defines a second passageway configured for receipt of the support member. The collar is positioned so that the second passageway is in substantial registry with the at least one body panel opening.

By the above, the present invention provides a simple and effective device for securing ladders to a vehicle body, especially to an equipment rack on a vehicle body. The present invention further provides such an arrangement that may be secured within the confines of the vehicle interior.

DESCRIPTION OF THE PREFERRED EMBODIMENT

Figure 1:
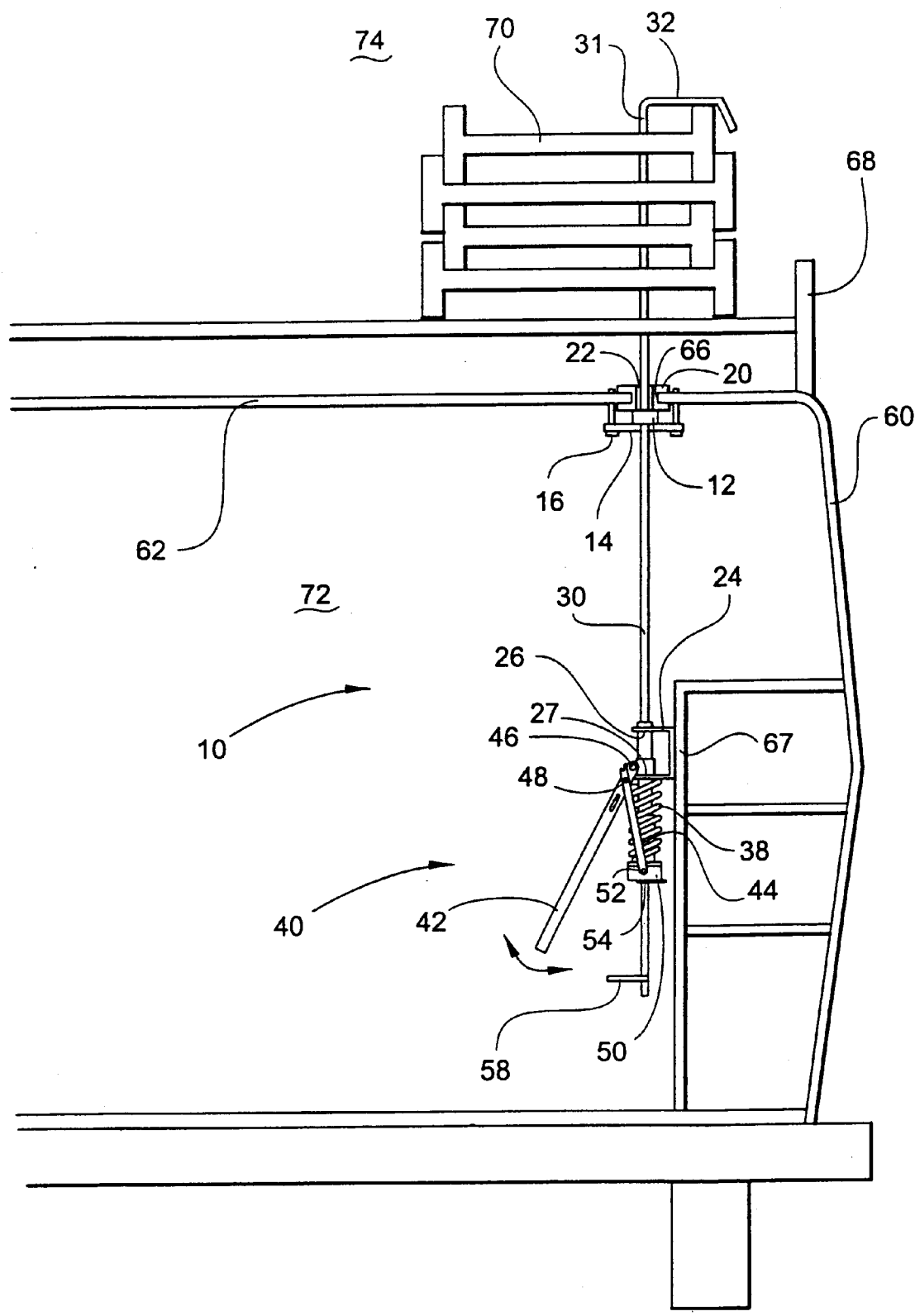
FIG. 1 is a diagrammatic view of an equipment securing device according to a preferred embodiment of the present invention illustrated holding ladders to a ladder rack attached to a vehicle.

Turning now to the drawings and, more particularly to FIG. 1, an equipment securing apparatus for securing equipment to an exterior surface of a vehicle is illustrated generally at 10 and includes an elongate shaft 30. The shaft 30 includes an engagement arm 32 extending laterally away from a distal end 31 of the shaft 30. The engagement arm 32 may be formed into a hook for engagement with ladders 70. The apparatus 10 is mounted in a vehicle 60 having vehicle body panels 62. An opening 66 is formed in the vehicle body panel through which the shaft 30 may pass. The shaft 30 is freely rotatable in the opening 66 in the body panel 62. It should be noted that while the opening 66 in the body panel 62 is shown in the overhead portion of the vehicle 60, the present invention may be practiced with the shaft 30 oriented horizontally and extending through an opening in a side panel of the vehicle 60.

An equipment rack 68 is disposed on top of the vehicle 60 and is illustrated as carrying a plurality of ladders 70. The body panels 62 define an interior portion 72 of the vehicle and an area 74 exterior of the vehicle. The ladders 70 are carried on the ladder rack 68 exterior of the vehicle.

An interior rack 67 or other support fixed to the vehicle is provided for mounting a lower portion of the shaft 30 within the interior 72 of the vehicle 60, as will be explained in greater detail hereinafter.

As previously stated, the shaft 30 extends through an opening 66 formed in a vehicle body panel 62. To prevent weather damage to the vehicle and its contents, a generally circular grommet 20 is attached to the opening 66 in the vehicle. The grommet may be a conventional grommet which is nothing more than essentially two rubber washers joined by a cylindrical member with one rubber washer exterior to the opening 66 and the other rubber washer interior to the opening 66. Alternately, a wear ring 22 formed from a wear resistant material may be provided within the grommet for contact with the rotatable shaft 30 to prevent wear to the grommet 20 which is generally a rubber member.

Figure 4:
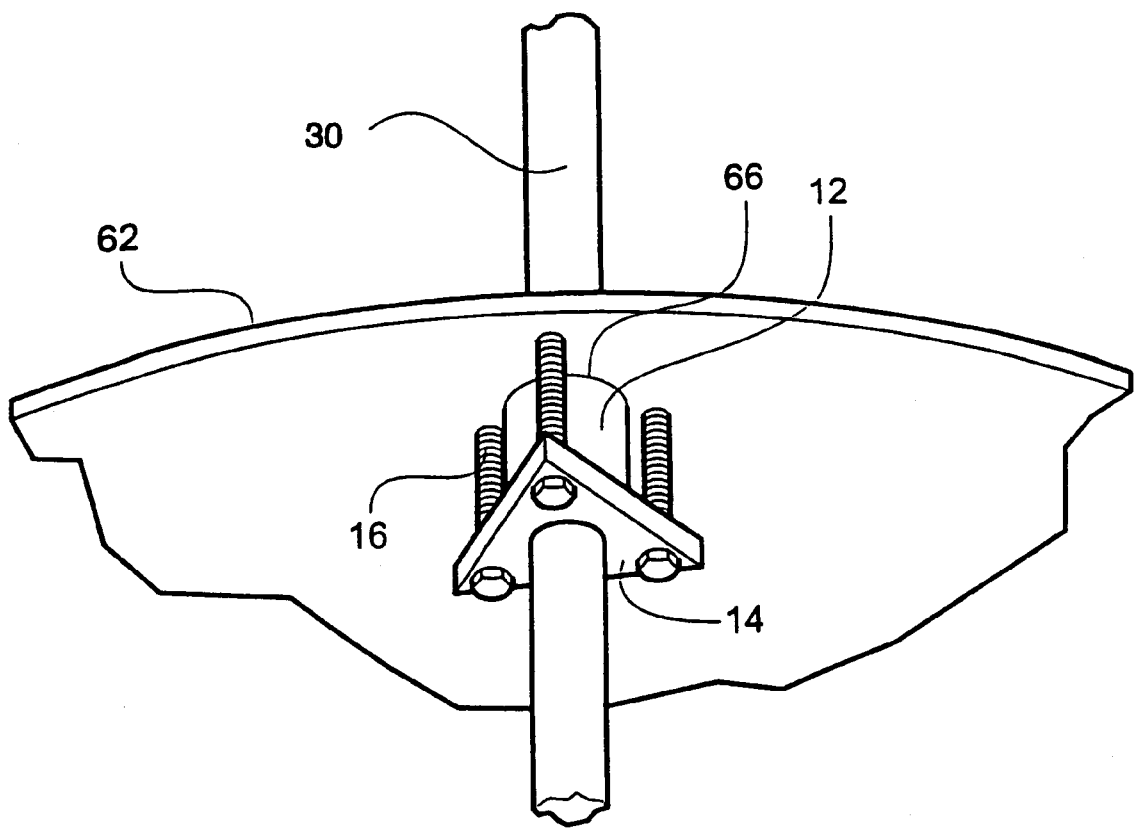
FIG. 4 is a perspective view of the attachment plate arrangement according to the present invention.

A first support member 12 is disposed within the interior of the vehicle 72 to support the shaft 30. The first support member 12 is formed as a generally hollow cylinder through which the shaft 30 passes. The first support member 12 is placed in abutment with the grommet 22 on the interior portion of the vehicle. In order to retain the first support member 12 in place, an attachment plate 14 is provided. The attachment plate 14 is also illustrated in FIG. 4 and may be formed as a triangular member or other geometric configuration. A plurality of bolts 16 extend from the attachment plate 14 through the body panel 62 and may be individually tightened so as to individually adjust pressure on different portions of the first support member 12. This may be used to account for and overcome surface irregularities on the inner surface of the body panel 62.

The first support member 12 and its associated structure generally stabilizes the shaft along an upper portion and directs the shaft outwardly into the area 74 exterior of the vehicle for engagement of the engagement member 32 with the ladder 70. The shaft 30 is also stabilized in a lower portion of the vehicle by a second support member 24.

The second support member 24 is generally formed as a plate having two arms projecting outwardly therefrom with passageways 26, 27 formed in each arm. The second support member 24 is attached to the interior rack 67 of the vehicle to provide a thrust surface for the latching assembly 40 as will be explained in greater detail hereinafter. A support tube 51 is mounted to the second support member through passageways 26 and 27. The shaft 30 extends through the support tube 51 in a manner allowing the shaft 30 to rotate. A handle 58 is removably attached to the shaft beneath the latching assembly 40 for aid in manipulating and positioning the shaft 30 and the engagement arm 32. Optionally, a knob (not shown) may be fitted to the base of the shaft 30 instead of the handle 58.

Figure 2:
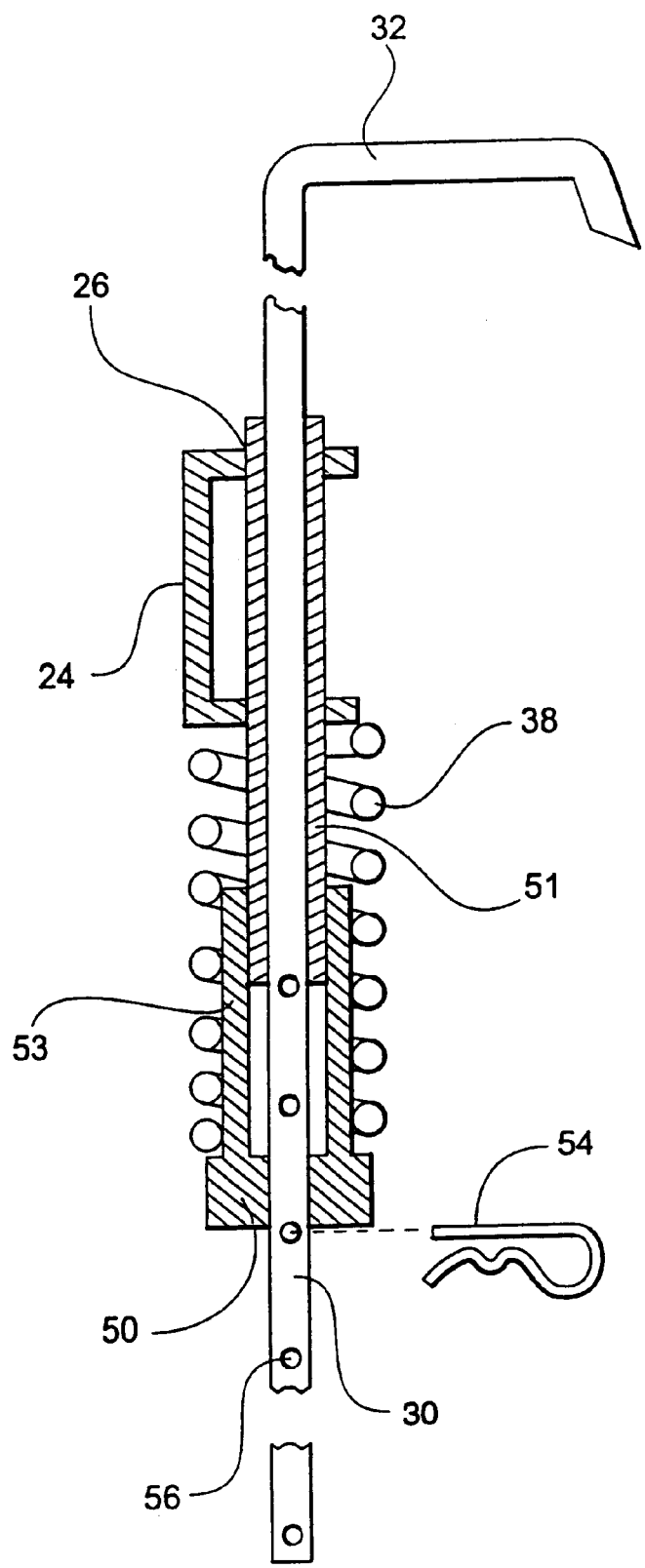
FIG. 2 is a side cutaway view of a latching assembly according to a preferred embodiment of the present invention.
Figure 3:
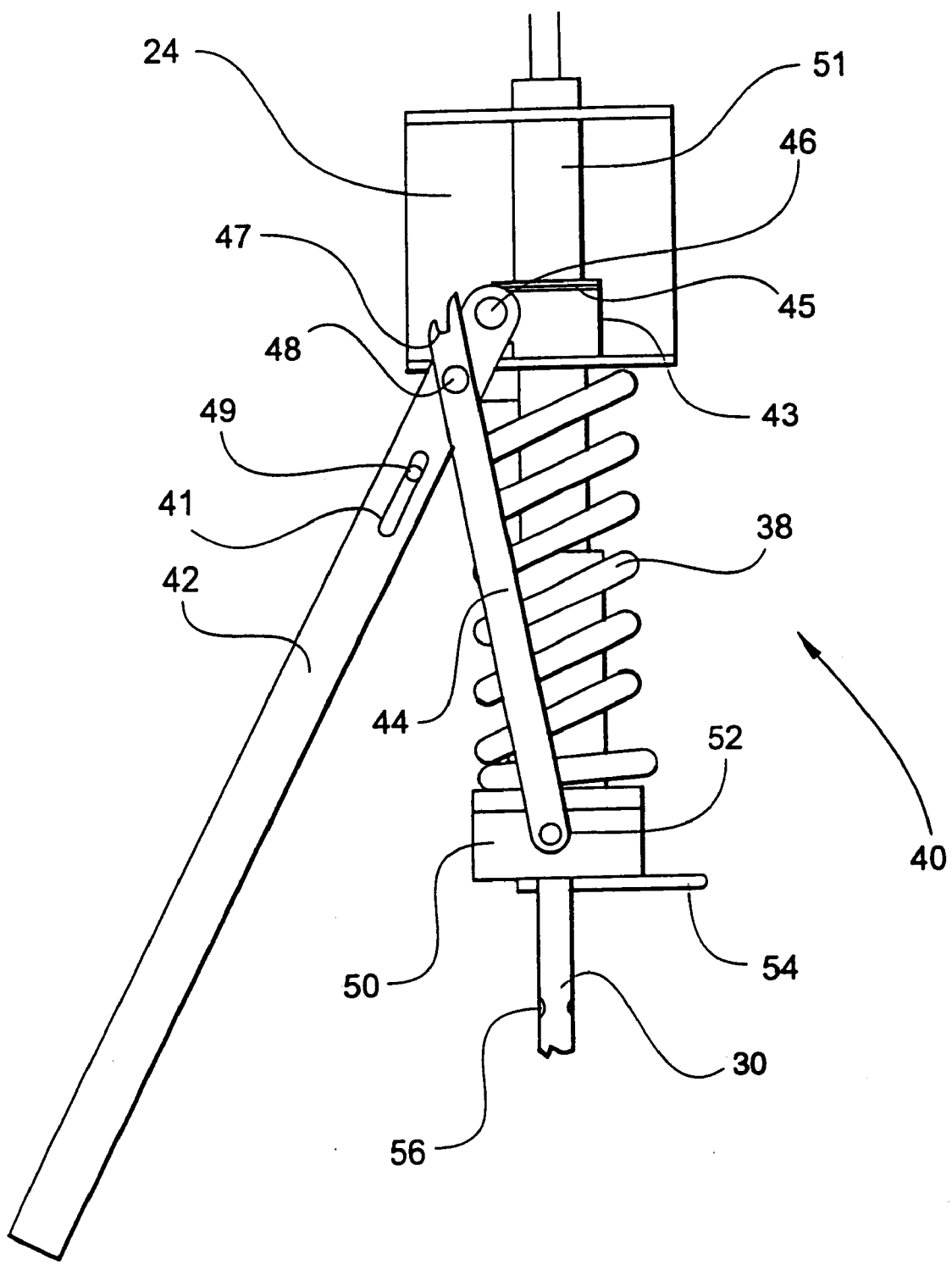
FIG. 3 is a side view of the latching assembly illustrated in FIG. 2.

A latching assembly 40 is provided and is also illustrated in FIGS. 2 and 3. The latching assembly allows movement of the shaft and acts to prevent movement of the shaft when it is purposefully engaged with ladders 70 or other equipment. The second support member 24 provides a base for the latching assembly 40.

An elongate control arm 42 is pivotally mounted to a U-shaped collar 43 at a control arm pivot 46. The collar 43 is rotatably mounted to the support tube 51 and is retained adjacent the lower arm of the second support member 24 by a snap ring 45. Motion of the control arm 42 is illustrated by an arrow in FIGS. 1 and 7. A slider 50 is disposed on the shaft 30 beneath the second support member 24 in an overlying, sliding relationship with the shaft 30 and the support tube 51. A link 44 extends from the control arm 42 to the slider 50. The link 44 is pivotally mounted to the control arm 42 at a pivot 48 and to the slider 50 at a pivot 52. Therefore, rotational movement of the control arm 42 is transmitted through the link 44 to the slider 50 which undergoes translatory motion along the shaft 30. It should be noted that while only one side of the latching assembly 40 is illustrated there are two links 44 provided in order to present a balanced load on the slider 50.

Because both the collar 43 and the slider 50 are rotatable relative to the support tube 51 and the shaft 30, the control arm 42 may be rotated approximately 200 degrees around the axis of the shaft 30. This permits the user to position the control arm 42 for best leverage and then reposition the control arm 42 to a more convenient storage position. This capability significantly adds to the convenience of operation of the equipment securing apparatus.

The latching assembly 40 includes a safety locking pin 49 slidably disposed in a slot 41 in the control arm 42. The locking pin 49 is configured for selective engagement with a locking notch 47 in the end of the link 44 when the control arm 42 is rotated to a position parallel to the link 44. When the locking pin 49 is engaged with the locking notch 47, the control arm 42 is prevented from rotating about the pivot 46.

In order to latch the engagement member 32 in an engaging relationship with the ladder 70, the slider 50 must be engaged with the shaft 30 to prevent further movement of the shaft 30 when the engagement member 32 engages the ladder 70. To that end, a spring 38 is disposed intermediate the slider 50, which functions as a spring support member, and the second support member 24. As seen in FIGS. 2 and 3, the slider 50 includes an upstanding tubular portion 53 that telescopically receives the shaft support tube 51 which extends through the second support member 24. Further, a plurality of openings 56 are formed in the shaft in areas adjacent the latching assembly 40. A stop member such as a pin 54, which may be a cotter pin or other type of pinlike member is provided and configured for fitment through a select one of the openings 56 in order to prevent further downward movement of the springdriven slider member 50. This relationship is best seen in FIG. 2. FIG. 3 illustrates the latching assembly 40 in a latched condition with the pin 54 projecting through one of the openings 56 in the shaft 30. It should be noted that the shank of a padlock (not shown) or a cable lock (not shown) can be passed through the shaft openings 56 for enhanced security.

In operation, a plurality of ladders 70 or other equipment are applied to the ladder rack 68 as illustrated in FIG. 1. From inside or outside the vehicle, the shaft 30 is manipulated and positioned such that the engagement member 32 is in engagement with the outermost ladder 70. It should be noted that the shaft 30 may be rotated a full 360° as necessary to provide a proper engagement of the engagement member 32 with the ladders 70 or other equipment load. Once the ladders 70 are positioned with the engagement member 32 in contact therewith in a desirable position, the control arm 40 is rotated upwardly about the pivot 46. This in turn moves the slider 50 upwardly against the biasing force of the spring 38. The control arm 40 may be locked in an upwardly rotated position using the locking pin 49 and locking notch 47 as will be described in more detail hereafter. The operator observes the shaft 30 until an opening 56 is revealed below the slider 50. At that time, the pin 54 is inserted in the opening 56, and the control arm 42 is released. The spring 38 acts to bias the slider 50 against the spring 54 which transmits this force to the shaft 30, pulling downwardly on the shaft 30 and engaging the ladders 70 with the engagement arm 32. In this manner, the ladders 70 are retained in place on the rack 68 by the engagement arm 32. In order to release the ladders, the operator must once again pull upwardly on the control arm 42 against the bias of the spring 38 which removes any force on the pin 54 which may then be removed. The shaft 30 may then be moved and the ladders 70 removed from the rack. Since the operable portion of the assembly is contained within the confines of the vehicle interior 72, locking the vehicle bars access to the latching assembly 40 and therefore acts to securely lock the ladders 70 to the rack 68.

During the engagement process, the operator may lock the control arm 42 in an upwardly rotated position by engaging the locking pin 49 with the locking notch 47. The locking pin 49 is disposed within the control arm slot 41 so that the locking pin 49 is pulled by gravity toward whichever end of the slot 41 is lower. When the control arm 42 is rotated upward, the locking pin 49 slides toward the end of the slot 41 nearer the pivot 46. When the control arm 41 reaches a position substantially parallel to the link 44, the locking pin 49 drops into engagement with the locking notch 47. This effectively locks the slider 50 and the compressed spring 38 so that the pin 54 may be inserted in the selected opening 56 without the danger of the spring 38 causing the slider 50 to engage the pin 54 prematurely.

Figure 5:
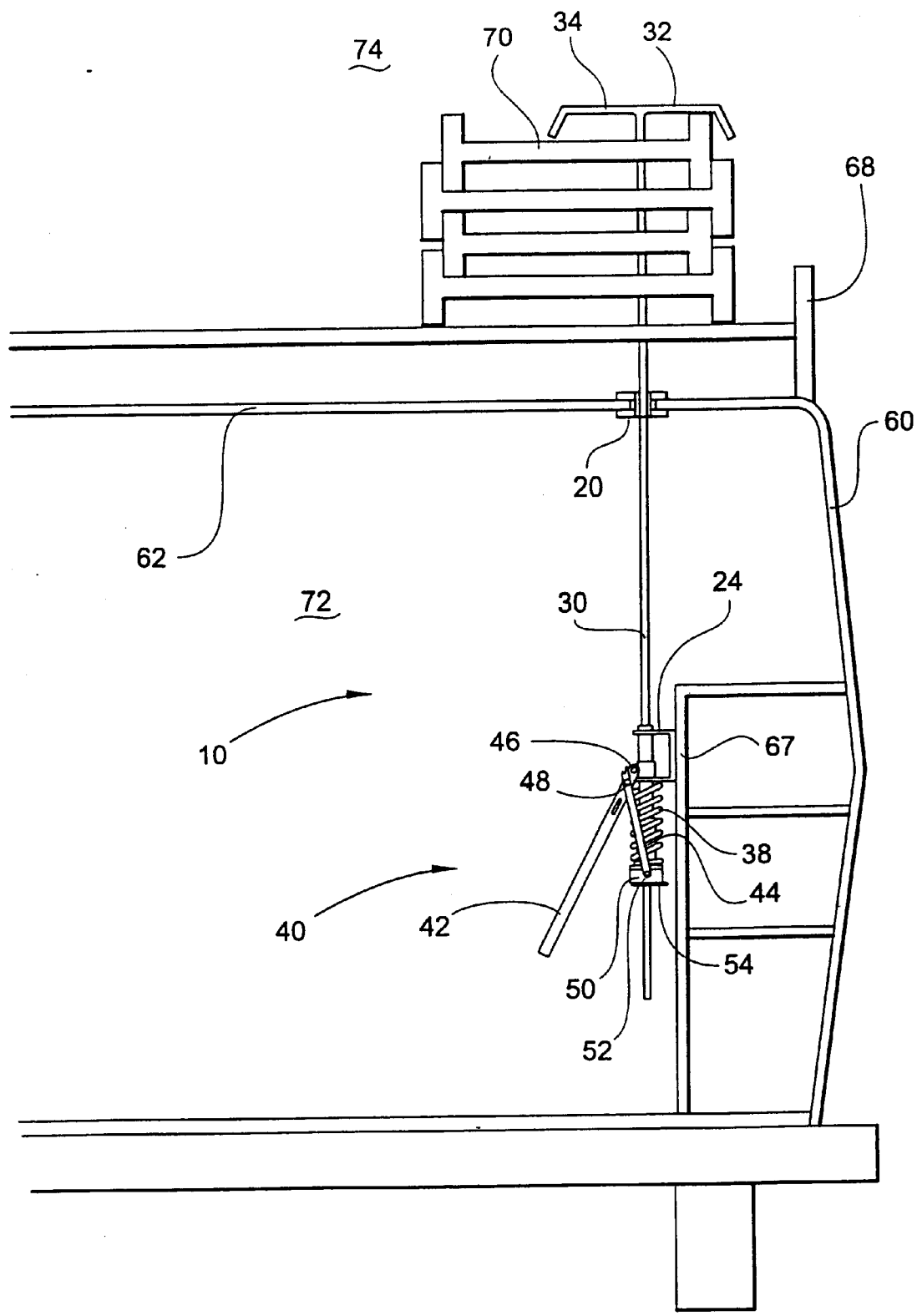
FIG. 5 is a diagrammatic view of a second preferred embodiment of the present invention.
Figure 6:
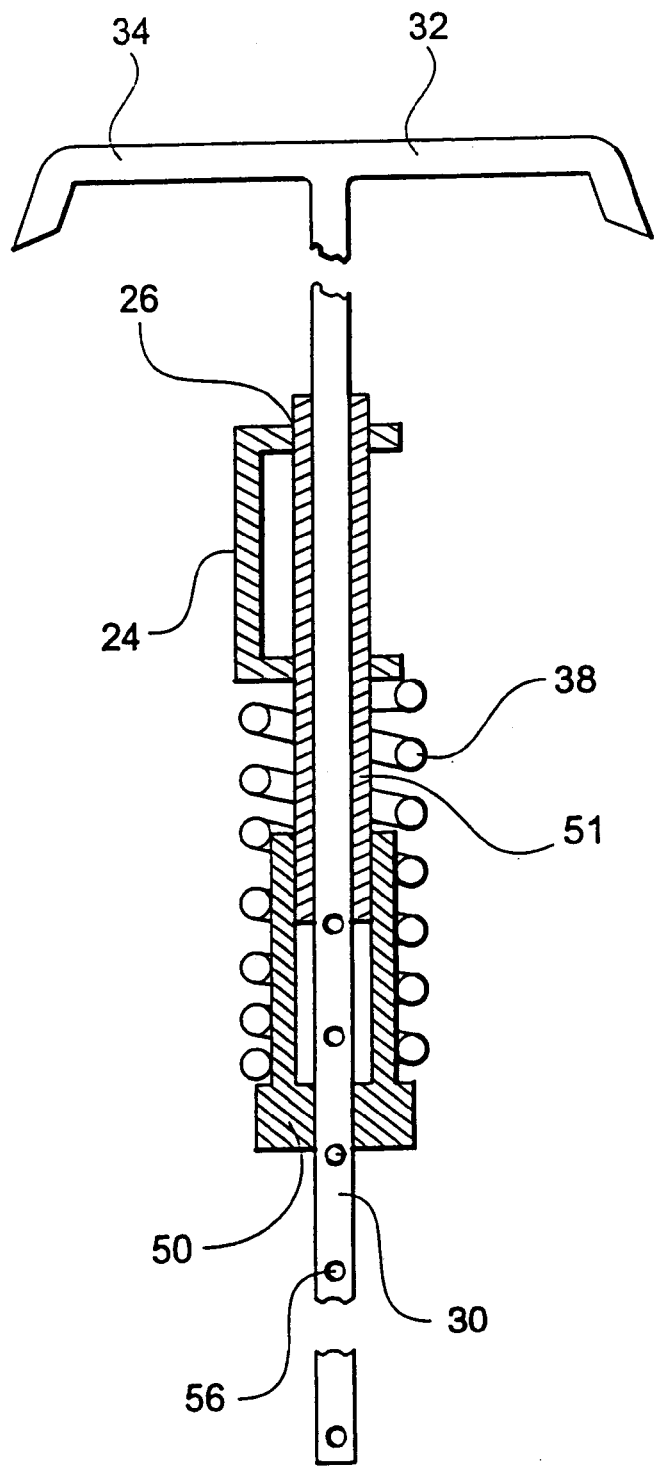
FIG. 6 is a side cutaway view of the engagement member according to a second preferred embodiment of the present invention.
Figure 8:
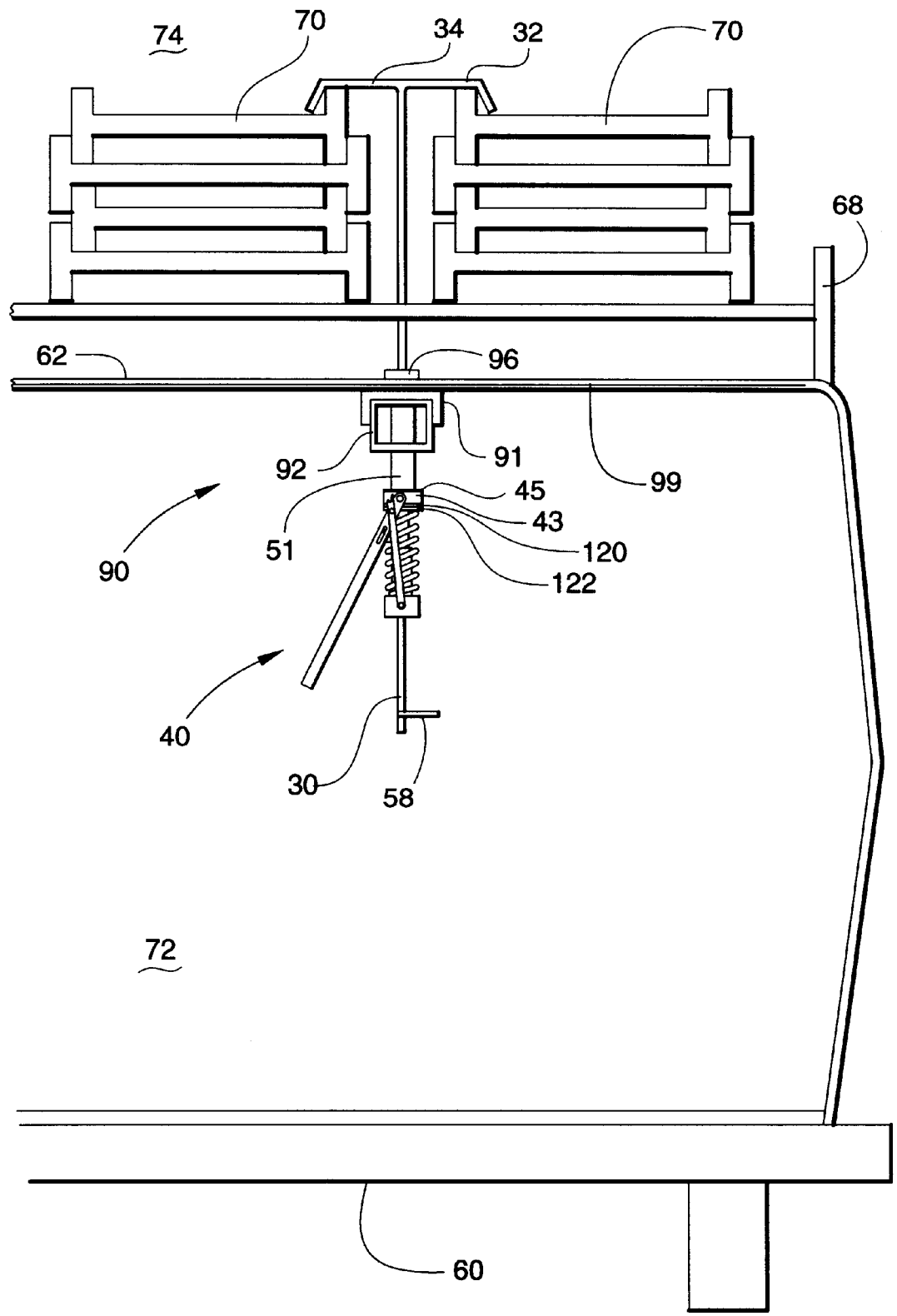
FIG. 8 is an end view of an open vehicle illustrating another preferred embodiment of the present invention.

An alternate embodiment of the equipment securing apparatus of the present invention is illustrated in FIGS. 5 and 6. There, a second engagement arm 34 projects laterally away from the distal end of the shaft 30 for engagement with ladders, or other equipment. As illustrated in FIG. 8, the second engagement arm 34 may be used to secure an additional set of ladders 70.

Figure 9:
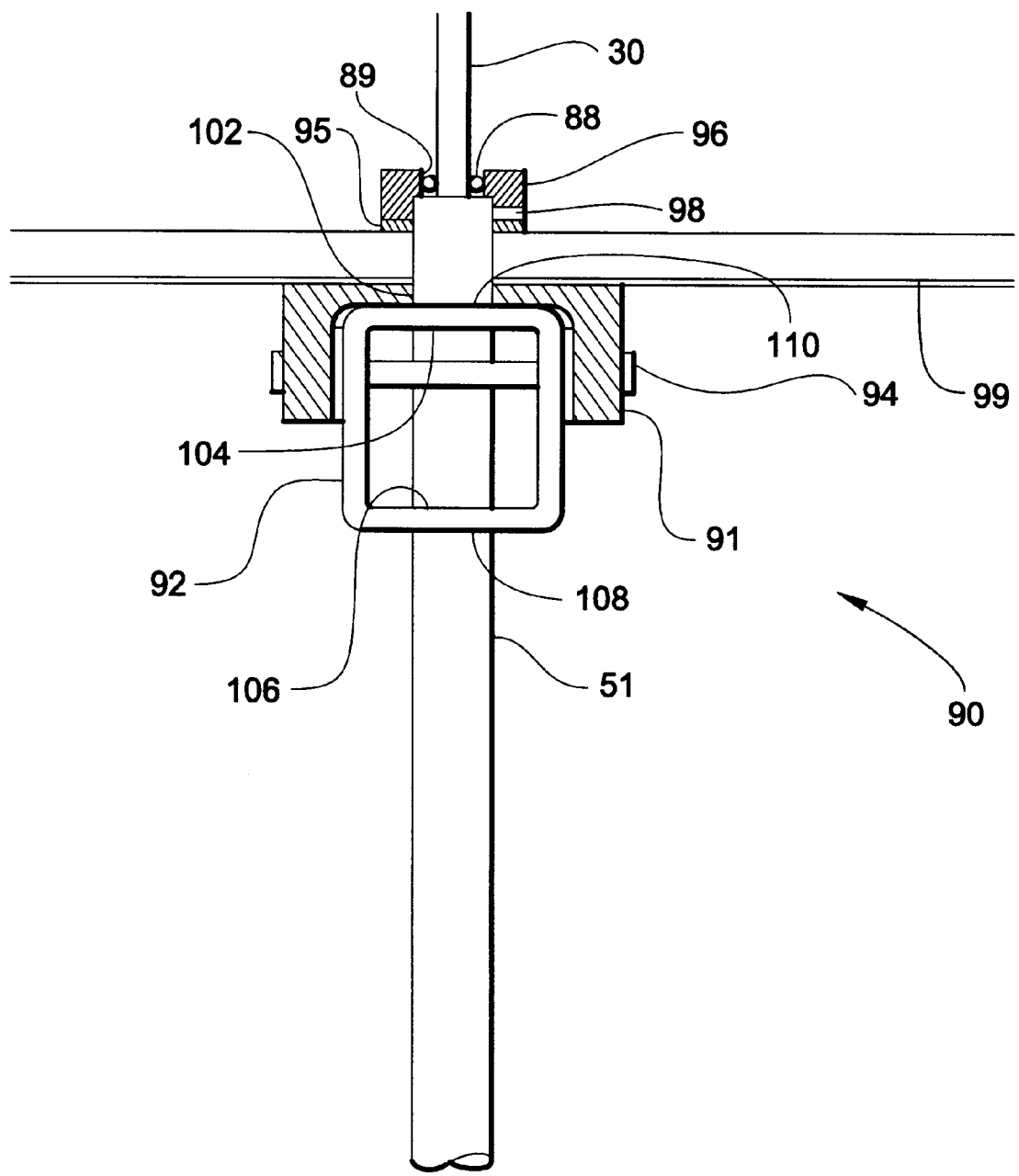
FIG. 9 is an end view of the roof attachment assembly of the equipment securing apparatus illustrated in FIG. 8.

Another alternate embodiment of the equipment securing apparatus of the present invention is illustrated in FIGS. 8 and 9. As with the previous embodiment, the equipment securing apparatus 10 includes a shaft 30, an engagement member 32, a support tube 51 and a latching assembly 40. In this embodiment, however, the support tube 51 extends through the opening 66 in the vehicle body panel 62. The support tube 51 is attached to the vehicle body panel 62 using a roof attachment assembly 90.

The roof attachment assembly 90 includes a support beam 91 that is preferably formed as a channel and that is attached to the body panel 62. The support beam 91 may be positioned so that it spans two or more lateral roof beams 99. The support beam 91 includes a beam passageway 102 aligned with the opening 66 for receipt of the support tube 51. A support collar 92 is disposed within the channel of the support beam 91 and attached to support beam 91 using two bolts 94. The support collar 92 is formed as a tube having a generally square cross-section. The support collar 92 includes two collar passageways 104, 106 aligned with the bean passageway 102 and the opening 66 for reciept of the support tube 51. Once disposed through the opening 66 and the passageways 102, 104, 106, the support tube 51 is held in place using snap rings 108, 110 above and below the support collar 92. A sealing pad 96 serves to prevent moisture or other external contaminants from entering the interior of the vehicle. The sealing pad 96 has a shaft passageway 89 through which the shaft 30 is received and is attached to the end of the support tube 51 using a set screw 98. An O-ring 88 is positioned within the shaft opening 89 to provide a seal around the shaft. A layer of foam 95 is disposed between the seal pad 96 and the vehicle panel 62 to protect the vehicle panel from damage.

The latching assembly 40 of this embodiment may be configured and operated as in the other embodiments. It will be appreciated that the control arm 42 must be sufficiently spaced from the panel 62 so that the locking pin 49 can be engaged with the locking notch 47. A washer 120 supported by a snap ring 122 is disposed around the support tube 51 to provide a bearing surface for the collar 43.

Figure 10:
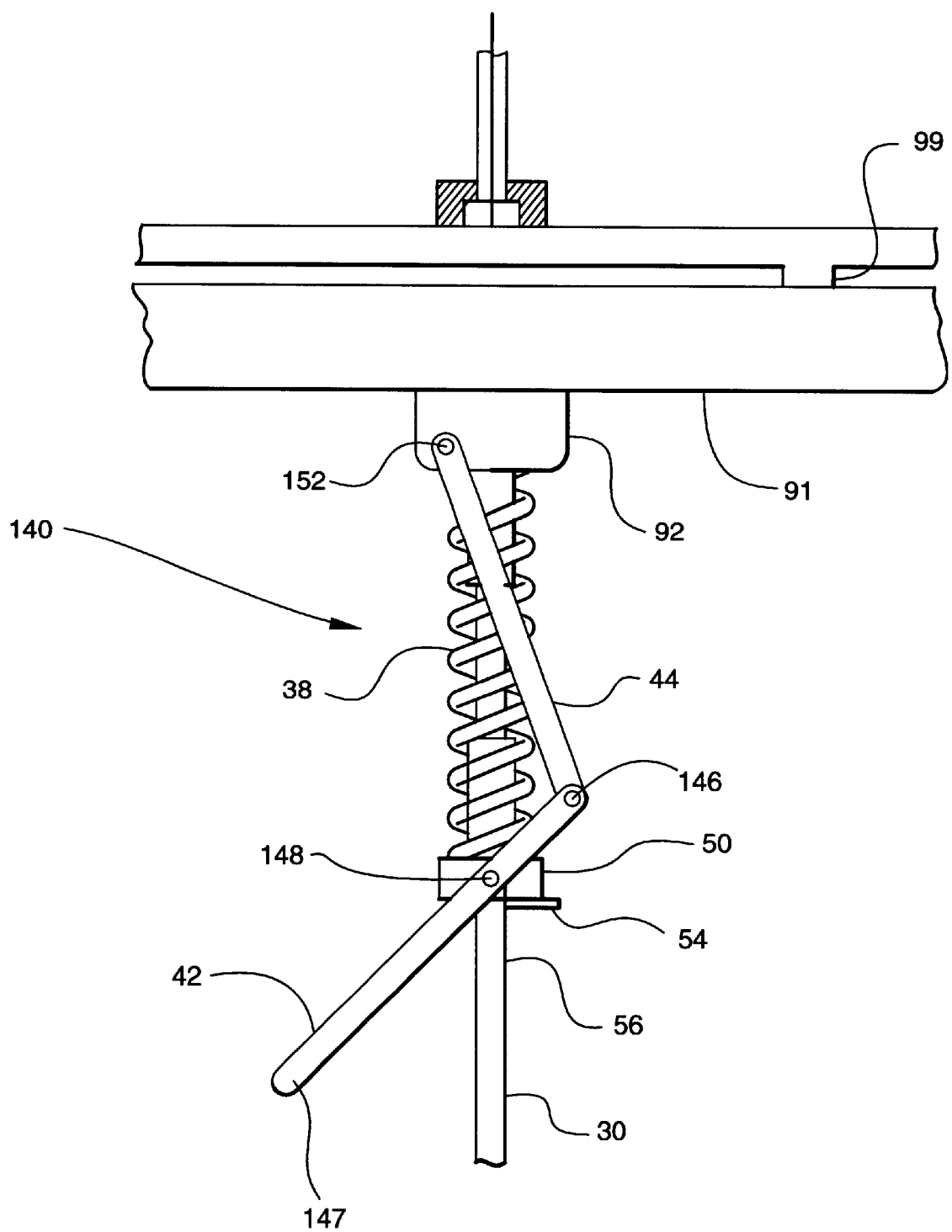
FIG. 10 is a side view of a latching assembly according to another preferred embodiment of the present invention.

Alternatively, the latching assembly 140 illustrated in FIG. 10 may be used. In this embodiment, the control arm 42 is pivotally attached to the link 44 at a pivot 146 that is positioned near one end of both the control arm 42 and the link 44. The opposite end of the link 44 is pivotally attached to the support collar 92 at another pivot 152. The control arm 42 is pivotally attached to slider 50 at a pivot 148 that is spaced apart from the link pivot 146. This arrangement of pivots 146, 148, 152 provides a mechanical advantage to the operator for compression of the spring 38. An upward force applied to the free end 147 of the control arm 42 will cause the control arm 42 to rotate about link pivot 146, forcing the slider 50 to move upward, thereby compressing the spring 38. In operation, the engagement member 32 is placed in position to secure equipment to the vehicle as in other embodiments. The control arm 42 is then rotated to compress the spring 38. A pin 54 is then inserted into one of the openings 56 in the shaft 30. When the control arm 42 is released, the slider 50 will move downward to make contact with the pin 54. The biasing force of the spring 38 will then hold the slider 50 against the pin 54 thereby by preventing upward movement of the shaft 30 and holding the engagement member 32 in place as in the other embodiments.

In the roof-mounted embodiments, the support beam 91 may have a plurality of beam passageways 102 arranged along its length and aligned with a plurality of panel openings 66. This would permit variable positioning of the other components of the apparatus so that the shaft 30 and engagement member 32 could be used to hold equipment positioned anywhere on the rack 68. Unused panel openings 66 would be sealed to prevent access to the interior.

Figure 7:
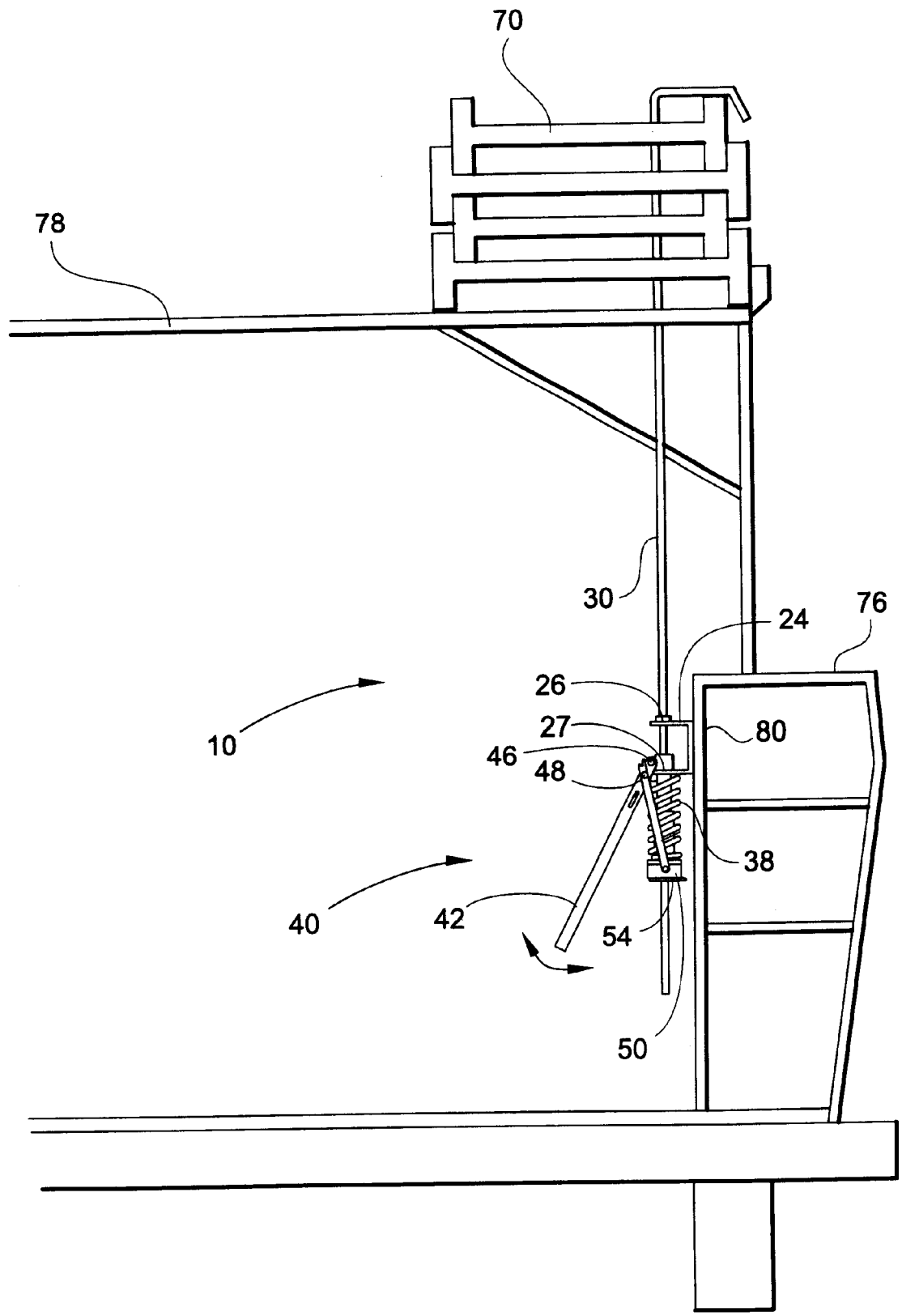
FIG. 7 is an end view of an open vehicle illustrating another preferred embodiment of the present invention.

Another embodiment of the present invention is illustrated in FIG. 7. There, an open vehicle 76, such as a pick-up truck is illustrated in diagrammatic form. The open vehicle 76 includes a ladder rack 78 carrying a plurality of ladders 70. Optionally, other types of equipment may be carried on the rack 78. As in the prior embodiments, a latching assembly 40 is attached to a fixed portion 80 of the vehicle body 76. The latching assembly 40 remains the same as in prior embodiments. The first support member illustrated in the prior embodiment is omitted due to the lack of any upper body portion to which the shaft must pass. Optionally, a support member (not shown) may be utilized and attached to the rack 78 if necessary to stabilize the shaft 30. Otherwise, the equipment securing apparatus 10 illustrated in FIG. 7 is similar to the other embodiments.

The embodiment illustrated in FIG. 7 lacks the security provided by a closed vehicle yet it will be apparent to those skilled in the art that a padlock or other form of locking mechanism may be substituted for the pin 54 in order to lock the equipment securing apparatus 10 in engagement with any equipment carried on the rack 78.

The uses of the present invention are vast. As stated before, the present invention can extend through both an upper body panel such as the top of a van or through the side body panel. Additionally, other equipment may be used and engagement arms may be designed to interact with particular equipment.

By the above, the present invention provides a versatile and easy to use apparatus for securing ladders or other equipment to an exterior portion of a vehicle.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. An equipment securing apparatus for securing equipment to a vehicle, said equipment securing apparatus comprising:

a support member attachable to a portion of the vehicle and having a shaft retaining portion with a first passageway formed therein;

an elongate shaft having a proximal end and a distal end, and a plurality of openings formed therein, said shaft being slideably mounted to said support member and extending through said first passageway of said shaft retaining portion so that said distal end of said shaft can project away from the vehicle;

an equipment engagement member formed on said distal end of said shaft for securing engagement with equipment on the vehicle; and a latching assembly operatively associated with said shaft and including a spring support member, a spring surrounding said shaft intermediate said support member and said spring support member, a stop pin selectively mountable in one of said openings in said shaft, a link member having a pivot end pivotally attached to said support member and a free end, a manual control arm pivotally attached to said free end of said link member and operatively connected to said spring support member to selectively move said spring support member into and out of an engaging relationship with said stop pin to retain said engagement member in a securing relationship with the equipment and to release said engagement member from engagement with the equipment.

* * * * *